Nov. 13, 1951     F. H. SLAYMAKER     2,574,596
ULTRASONIC DISTANCE-MEASURING SYSTEM
Filed April 6, 1948     2 SHEETS—SHEET 1

INVENTOR.
FRANK H. SLAYMAKER
BY
J. L. Bowes
ATTORNEY

Nov. 13, 1951     F. H. SLAYMAKER     2,574,596
ULTRASONIC DISTANCE-MEASURING SYSTEM
Filed April 6, 1948     2 SHEETS—SHEET 2

INVENTOR.
FRANK H. SLAYMAKER
BY
J. L. Bowes
ATTORNEY

Patented Nov. 13, 1951

2,574,596

UNITED STATES PATENT OFFICE 2,574,596

ULTRASONIC DISTANCE-MEASURING SYSTEM

Frank H. Slaymaker, Rochester, N. Y., assignor to Stromberg-Carlson Company, a corporation of New York Application April 6, 1948, Serial No. 19,360

6 Claims. (Cl. 177—352)

1

This invention relates to ranging devices and more particularly to such devices useful in guiding the blind by locating objects and surfaces.

It is an object of this invention to provide a new and improved ranging system which may give a sound indication, as a tone, the frequency of which depends upon distance, or a tactile stimulation, as a vibrator which vibrates at a frequency depending upon distance.

In accordance with my invention, there is provided a reference voltage which varies periodically as a function of the time between the radiation of a ranging pulse and the receipt of an echo of that pulse after reflection from an object or surface in the path of radiation, the period corresponding to the period between ranging pulses. A control voltage is obtained by sampling the reference voltage at the time of receipt of the echo. The control voltage is utilized to control the operation of a suitable variable frequency generator, such as a multivibrator, for example. The output of the generator is utilized to provide and indication of the distance to the echo-producing object or surface.

Figure 1:
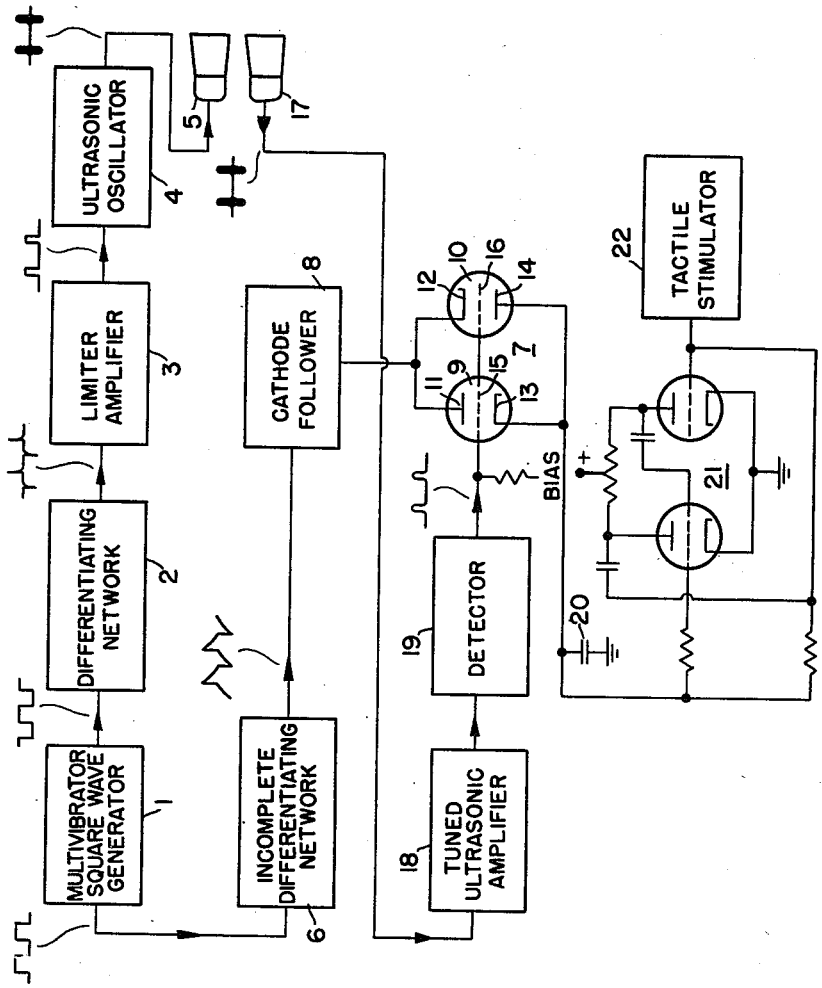
Figure 2:
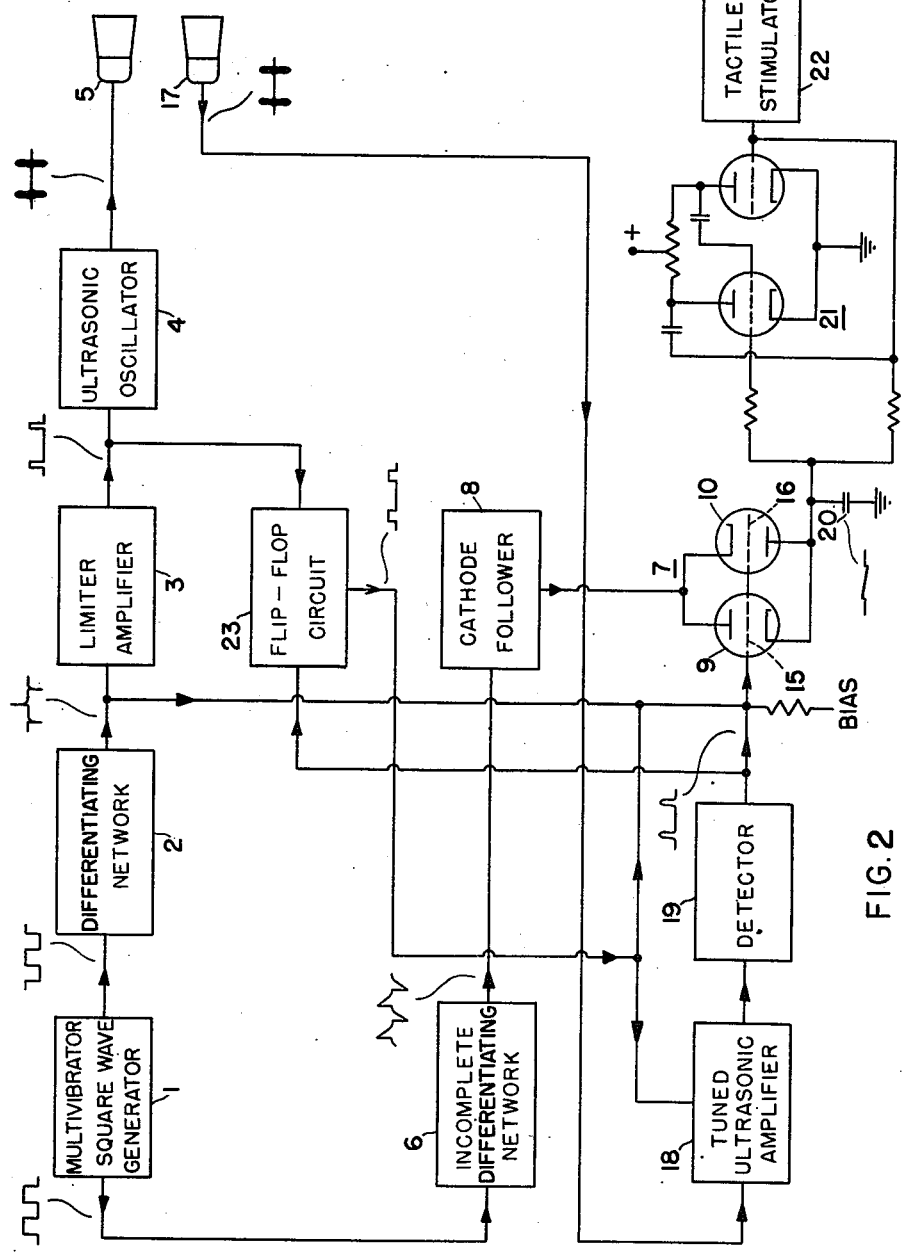

Other objects and advantages of my invention will become apparent as the following description proceeds, and the features of novelty which characterize my invention will be pointed out with particularity in the claims annexed to and forming a part of this specification. For a better understanding of my invention, reference may be had to the accompanying drawing in which Fig. 1 illustrates one embodiment of my invention, largely in block form; Fig. 2 illustrates in block form, a second embodiment of a ranging system including the principles of my invention; and Fig. 3 comprises a series of charts or waveforms helpful in understanding the principles of the present invention.

Referring to Fig. 1, there is shown a suitable source of pulses, such as a square wave generator 1 which is preferably a multivibrator. The negative-going pulses (Fig. 3C) appearing at one output (anode) terminal of the multivibrator are differentiated by a suitable differentiating network 2 as indicated at Fig. 3D. The positive peaks of the differentiated pulses are clipped and the negative peaks are squared and inverted by means of a suitable limiting amplifier 3 (see Fig. 3E). The pulses provided by amplifier 3 may be employed to trigger a suitable ultrasonic oscillator 4 for driving the radiator 5, which is preferably a highly directional device for radiating ultrasonic frequencies.

Referring again to generator 1, positive-going pulses (Fig. 3A) are also obtained, as at the anode of the other multivibrator discharge device, and incompletely differentiated in a suitable network 6, as represented in Fig. 3B. These pulses are obviously synchronized with the negative-going pulses utilized to cause the radiation of ranging pulses, and constitute a reference voltage which varies as a function of time.

The output of network 6 thereby comprises a varying reference voltage which recurs with a predetermined periodicity. The reference voltage is applied to a suitable sampling circuit 7, as by means of a cathode follower 8.

The sampling circuit 7 may include a pair of electron discharge devices 9 and 10 having anode 11 connected to cathode 12 and to the output of cathode follower 8; having cathode 13 connected to anode 14; and having the control electrodes or grids 15 and 16 connected together. Thus, the reference voltage is applied to anode 11 and cathode 12. The discharge devices 9 and 10 are biased such that the reference voltage alone does not cause conduction through either device or tube but the addition of echoes to control electrodes 15 and 16, described hereinafter, renders that one of the devices conductive in which the anode is sufficiently positive with respect to its cathode.

Echoes of the radiated ultrasonic pulses are received by suitable receiving means such as a microphone 17, as indicated in Fig. 3G. These received pulses are employed to sample the amplitude of the reference voltage at the time of receipt of the echoes. The echoes are suitably amplified by means of a tuned ultrasonic amplifier 18 containing at least one electron discharge device and detected in a suitable detector 19, the output of the detector (Fig. 3H) being applied to control electrodes 15 and 16. The detector should be arranged to provide positive output pulses and is provided so that only the positive swings of the echo signal are passed.

There is provided a "memory" circuit comprising a suitable capacitor 20 connected between cathode 13 and anode 14 and ground. Whenever either discharge device 9 or 10 conducts, the reference potential is transferred to capacitor 20. This potential is stored in capacitor 20 until the next sample of the reference potential is taken. The potential across capacitor 20 constitutes a control potential (Fig. 3I) which I employ to control a variable frequency oscillator 21 which may be a multivibrator arranged so that the potential to which the grid leaks are returned controls the frequency. In the preferred embodiment of my invention, circuit constants and supply potentials are chosen so that the frequency of the oscillator varies from 20 to 200 cycles per second, depending upon the control potential stored in capacitor 20, this response being used to provide an indication, as by driving a tactile stimulator 22, for example.

Figure 3:
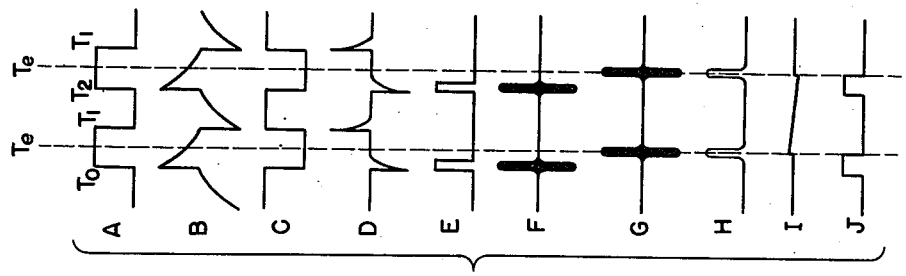

Reviewing operation of the system, the control electrodes 15 and 16 are normally biased more negative than cut-off, and the tubes 9 and 10 conduct only when an echo in the form of a positive pulse is introduced on the grids 15 and 16 from the output of detector 19. Referring to Fig. 3, let $T_0$ and $T_2$ represent the times of radiation of pulses; let $T_e$ represent the times of receipt of echoes; and let $T_1$ represent the ends of the square waves produced by generator 1. If an echo arrives at a time between $T_0$ and $T_1$, the grids or control electrodes of sampling circuit 7 allow either tube 9 or 10 to conduct for the duration of the echo and the potential of the reference voltage at time $T_e$ is transferred to capacitor 20 (Fig. 3I). Since the amplitude of the transferred potential depends upon time, the amplitude of the potential applied to multivibrator 21, and hence the frequency of operation of multivibrator 21, is a function of the time which has elapsed between the radiation of the pulse and the return of the echo.

When the echo returns immediately after $T_0$, the reference voltage at the moment of sampling is high and, consequently, the frequency of the controlled multivibrator 21 is high. If the echo arrives just before $T_1$, the reference voltage is low and the frequency of controlled multivibrator 21 is low. If, however, an echo should arrive after $T_1$, the reference voltage is so far negative that multivibrator 21 stops operation. This result means that it is possible to adjust the circuit constants so that the system responds to echoes from objects closer than a predetermined distance but not to echoes in the same period which are from objects or surfaces further away than this arbitrary distance. It is possible to adjust the time intervals $T_0$—$T_1$ with respect to time intervals $T_1$—$T_2$ by making multivibrator 1 unsymmetrical instead of symmetrical as shown.

The system represented by Fig. 2 contains refinements to cover situations in which no echo is received or when more than one echo is present. If the ranging device comprising radiator 5 and receiver 17 is directed toward and obstacle which is so close that the echo arrives shortly after time $T_0$, a certain potential is stored in storage means or capacitor 20 and multivibrator 21 operates at a corresponding frequency. When there is more than one echo present, the nearest echo establishes one potential across capacitor 20 and then the next echo in the same period may change the potential. Means is provided to make either the receiver, as amplifier 18 for example, or the sampling circuit 7, or both, inoperative from the moment that the first echo is received until the next pulse is radiated. One circuit for rendering both inoperative is shown in block form in Fig. 2. A "flip-flop" circuit 23 is used and is so connected that it is flipped "positive" by the pulses from the limiting amplifier 3 at the time the pulses are radiated. This positive potential is applied to the bias circuit of amplifier 18, for example, and the sampling circuit 7. The resultant grid bias at amplifier 18 is made such that the amplifier is in normal operating condition when the positive bias from flip-flop circuit 23 is applied. Hence, the receiver passes (i. e., amplifier 18 amplifies, according to the illustrative example depicted) any echo received during the interval in which the flip-flop circuit is flipped positive. The bias applied to the sampling circuit 7, however, is of such value that it doesn't quite overcome an initial negative bias but, instead, brings the net grid bias up to the point where the positive pulse from detector 19 added to the positive bias from the flip-flop circuit is sufficient to make one of the discharge devices 9, 10 conduct.

The output of the detector 19 is also connected to the flip-flop circuit in such a way that the detector pulses flop the flip-flop circuit negative. The net bias in the amplifier 18 is then such that the amplifier is cut off and no more echoes are passed until the next ranging pulse is radiated.

The bias on the sampling circuit 7, after the flip-flop circuit has flopped negative, is such that the tubes 9 and 10 are cut off regardless of the input to control electrodes 15 and 16.

Since the flip-flop circuit does not flip negative until after the echo appears in the detector output, the reference voltage is sampled at the instant of the return of the first echo but is not sampled again until after the next ranging pulse is radiated.

In order to stop the operation of multivibrator 21 when no echo is present, the output of differentiating network 2 is connected to the input of sampling circuit 7. The positive pips in the output of differentiating network 2 occur at time $T_1$ (Fig. 3D) and are used as synthetic echoes arriving so late that the sampling circuit samples the negative portion of the reference voltage, thus stopping the multivibrator 21. The bias on the sampling circuit must be sufficiently negative, after the flip-flop circuit has flipped negative, so that if a true echo arrives before time $T_1$, the synthetic pulse cannot cause another sampling operation.

While I have shown and described a particular embodiment of my invention, it will be obvious to those skilled in the art that changes and modifications may be made without departing from my invention in its broader aspects. For example, separate sources of reference voltage and radiated pulses may be utilized. Further, a single ranging device may be provided, comprising radiator 5 and receiver or microphone 17 suitably connected together. Also, in some cases, it may be found that the detector 19 is unnecessary. I, therefore, aim in the appended claims to cover all such changes and modifications as fall within the true spirit and scope of my invention.

What I claim is:

1. In a ranging system, a source of control pulses of direct-current energy, means utilizing said control pulses for causing the radiation of ranging pulses of ultrasonic energy, means for receiving echoes of said ranging pulses after reflection from an object in the path of said ranging pulses, means for providing a cyclically recurring reference voltage which varies continuously as a function of time, the period of variation corresponding to the period between said ranging pulses, means for sampling said reference voltage at the times of receipt of said echoes, means utilizing the samples of said reference voltage for providing an indication of the distance to said object, said reference voltage being positive-going for a predetermined period after radiation of a ranging pulse and negative-going during the period between the end of said predetermined period and the next radiated pulse, and means utilizing the negative-going portions of said reference voltage for preventing response to echoes returned from objects located more than a predetermined distance from said receiving means.

2. In a ranging system, a source of control pulses of direct-current energy, means utilizing said control pulses for causing the radiation of ranging pulses of ultrasonic energy, means including at least one electron discharge device for receiving echoes of said ranging pulses after reflection from an object in the path of said ranging pulses, means for providing a cyclically recurring reference voltage which varies continuously as a function of time, the period of variation corresponding to the period between said ranging pulses, means including at least one electron discharge device for sampling said reference voltage upon receipt of an echo, means utilizing the samples for providing an indication of the distance to said object, and means for so biasing at least one of said discharge devices during the interval preceding receipt of the first echo that receipt of an echo renders operative said sampling means and for causing said bias to become sufficiently negative upon receipt of said first echo for preventing further operation of said sampling means during the interval between said first echo and the radiation of the next pulse.

3. In a ranging system, a source of control pulses of direct-current energy, means utilizing said control pulses for causing the radiation of ranging pulses of ultrasonic energy, means for receiving echoes of said ranging pulses after reflection from an object in the path of said ranging pulses, means for providing a cyclically recurring reference voltage which varies continuously as a funtcion of time, the period of variation corresponding to the period between said ranging pulses, means for sampling said reference voltage at the time of receipt of said echo, means utilizing the samples of said reference voltage for providing an indication of the distance to said object, biasing means capable of providing selectively an output voltage which is either positive or negative, means utilizing said control pulses for causing said biasing means to have a positive output during the interval between the radiation of a ranging pulse and the receipt of the first echo, means including said positive output for biasing at least one of said discharge devices sufficiently close to cutoff to enable said one discharge device to be rendered conductive by the receipt of the first echo whereby receipt of the first echo renders operative said sampling means, and means utilizing said first echo for causing said biasing means to have a negative output for maintaining inoperative said sampling means during the period between the receipt of said first echo and the radiation of the next ranging pulse.

4. In a ranging system, a source of control pulses of direct-current energy, means utilizing said control pulses for providing a cyclically recurring reference voltage which continuously varies with time and having positive-going and negative-going portions, a second source of control pulses, means for differentiating said control pulses, means utilizing said differentiated control pulses for causing radiation of a ranging pulse of ultrasonic energy at the time of the initiation of each positive-going portion of said reference voltage, means for receiving echoes of said ranging pulses after reflection from an object in the path of said ranging pulses, means for sampling said reference voltage at the time of the receipt of each echo, means including a variable frequency oscillator for giving an indication of the distance to said object, said oscillator including an electron discharge device, and means utilizing the pips of said differentiated pulses corresponding in time to the end of said control pulses for rendering operative said sampling means at such time that said sampling means samples said reference voltage during the next negative portion thereby applying a negative bias beyond cutoff to said discharge device whereby in the absence of a true echo during the period of the positive portion of said reference voltage said oscillator is rendered inoperative.

5. In a ranging system, a single source of direct-current control pulses which recur uniformly and cyclically at a constant rate of repetition, means for deriving a first train of control pulses from said source, means for differentiating said control pulses of said first train, means utilizing said differentiated pulses for causing the radiation of ranging pulses of ultrasonic energy, means for receiving echoes of said ranging pulses after reflection from an object in the path of said ranging pulses, means utilizing said source for developing a second train of pulses, incomplete differentiating means for providing a cyclically recurring reference voltage from said second train of control pulses, said reference voltage varying continuously as a function of time corresponding to the period between said ranging pulses, means for sampling the amplitude of said reference voltage at the times of receipt of each of said echoes, and means utilizing the samples of the reference voltage for providing an indication of the distance to said object.

6. The device of claim 5 in which said source of control pulses is a multivibrator square wave generator and said trains of control pulses are the synchronized positive going and negative going pulses produced by said multivibrator, one polarity of said synchronized pulses being the first train of control pulses utilized by said differentiating means and the other polarity of said synchronized pulses being the second train of control pulses utilized by said incomplete differentiating means.

FRANK H. SLAYMAKER.

REFERENCES CITED

The following references are of record in the file of this patent:

UNITED STATES PATENTS

| Number | Name | Date |
|---|---|---|
| 2,012,837 | Tear | Aug. 27, 1935 |
| 2,144,843 | Hearn | Jan. 24, 1939 |
| 2,250,708 | Herz | July 29, 1941 |
| 2,301,195 | Bradford | Nov. 10, 1942 |
| 2,371,988 | Granqvist | Mar. 20, 1945 |
| 2,403,527 | Hershberger | July 9, 1946 |
| 2,404,527 | Potapenko | July 23, 1946 |
| 2,415,119 | Wellenstein | Feb. 4, 1947 |
| 2,428,058 | Wise | Sept. 30, 1947 |
| 2,429,623 | Hoisington | Oct. 28, 1947 |
| 2,500,638 | Krauth | Mar. 14, 1950 |

FOREIGN PATENTS

| Number | Country | Date |
|---|---|---|
| 406,592 | Great Britain | Mar. 1, 1934 |
| 469,417 | Great Britain | July 26, 1937 |
| 546,202 | Great Britain | July 2, 1942 |